Patented Aug. 11, 1942

2,292,748

UNITED STATES PATENT OFFICE 2,292,748

ACETONE-RESIN PRINTING INK

Carleton Ellis, Montclair, N. J.; Carleton Ellis, Jr., Bertram Ellis and Bank of Montclair, executors of said Carleton Ellis, deceased, assignors to Ellis Laboratories, Incorporated, a corporation of New Jersey No Drawing. Application April 3, 1940,
Serial No. 327,661

7 Claims. (Cl. 260—29)

This invention relates to printing inks and more particularly to the use of acetone resins as binders in quick-drying inks.

High-speed presses as are commonly employed for a large proportion of printing require a quick-drying ink for use therein. The modern newspaper presses now use a mineral oil ink that is fluid enough to be easily absorbed by the paper. There is, however, a definite drawback to such inks and that is their inherent smudging. Because the mineral oil does not readily evaporate the inks remain undried for relatively long periods of time. These mineral oil inks also have a tendency to "strike through" or "show through." Furthermore, it is difficult to secure a high gloss with the mineral oil inks.

Other quick-drying types depend more or less upon the use of specialized equipment for quick-drying of the inks used. Among the inks of this type are the drying-oil inks which require ozonators. Less frequently an oxygen bearing compound such as a peroxide is incorporated in the vehicle. Ozonators are expensive to operate and are subject to high maintenance costs. Inks containing peroxides are relatively unsafe if not in the finished state, at least in the compounding.

Quick-drying inks of the volatile solvent type are by far the best although some provision may be necessary for removal of fumes during the printing process. Recovery systems may be operated in conjunction with the use of volatile solvents and in so doing the cost of operating the extra equipment may be more than offset by the value of the recovered solvents. Inks having a water-base vehicle are desirable but usually the finished print is inferior to other inks due to its deterioration by humid atmospheres.

The mineral oil quick-drying type inks have little or no binder and consequently are only useful on an absorbent type of paper. On a highly calendered paper mineral oil inks smudge readily and consequently a volatile solvent type is much to be preferred since, in the latter, binders generally are incorporated which keep the pigment from smudging or offsetting.

Although inks ordinarily are classified as to the type of vehicle they contain, many other constituents go into the making up of an ink. Pigments may be obtained from natural sources, or may be manufactured. Also, many modifying agents are employed in inks to change such properties as flow, tack or body. Examples of these are cellulose derivatives, various waxes, glycerol and fatty acid soaps. Paraffin wax may be used as an evaporation retardant where the volatility of the solvent used in the vehicle is high. Binders commonly used in printing inks are synthetic resins, drying oils, cellulose derivatives and natural resins.

One object of my invention is to furnish a quick-drying printing composition in which acetone-formaldehyde resins are utilized as binders. Another object is to provide a high-gloss, quick-drying ink having an acetone-formaldehyde resin binder. A further object is to provide an inexpensive water-soluble resin binder that becomes water-insoluble on drying at slightly elevated temperatures. Further objects will be apparent to those skilled in the art.

I have observed that acetone-formaldehyde resins make suitable binders for quick-drying inks. A resin suitable for my invention may be made by reacting acetone and formaldehyde or paraformaldehyde in the presence of an alkali catalyst, that is, a catalyst of the alkaline type such as the salts, oxides or hydroxides of the alkali metal or the alkaline earth elements. The degree of polymerization or union is readily controlled by the time of heating and amount of catalyst used. If a water-soluble binder is desired the reaction is carried to the stage where the resulting resin is water-soluble. On prolonged heating the water-soluble resin is converted into a water-insoluble resin. In the latter case the binder is soluble in many organic solvents such as alcohols, acetone or benzene hydrocarbon derivatives.

One advantage of these binders is the high gloss that may be obtained if a large percentage of binder is used. It is ordinarily desirable to have a high gloss in inks used for posters, advertising cards, magazines and some books. The light color of these binders makes them applicable in light-colored inks such as the yellows, white or other analogous shades. The acetone-resin binder may be used with any of the solvents previously mentioned but preferably a relatively low-boiling solvent is used. Water-soluble types of resins prepared according to my invention when heated become insoluble in water, thus making a very inexpensive ink.

High-gloss inks are produced by using a relatively high proportion of binder to pigment. If only a small amount of binder is used and a large amount of pigment, the pigment particles tend to obscure the gloss produced by the binder and the resulting dried ink is dull or has very little gloss. A whole range of inks may be prepared from very dull to highly glossy inks by varying the pigment to binder ratio.

The method of setting or hardening these inks is by subjection of the printed sheet to a temperature that will volatilize the solvent rapidly. The time of heating need only be a few seconds and frequently the temperature employed is below the boiling point of the solvent used. Too rapid heating is to be avoided as the solvent may vaporize too quickly and cause roughness of the printed surface. Of course, where roughness is desirable the latter phenomena may be advantageously used. In any case the temperature at which the printed sheet is treated should be at least 50° C. and not higher than about 150° C. Heating of the printed web or sheets may be accomplished by any of the usual methods. A heated roller, gas flame, blast of heated air, passage through a furnace or any other method may be used to set the inks.

Other properties that may readily be varied are length, flow and tack. Because of the excellent binding qualities of acetone-formaldehyde resins, smudging is eliminated even when the amount of binder used is low compared to the amount of pigment. Drying oils are not used in conjunction with these binders and consequently the initial setting is final, that is to say, neither a prolonged hardening period nor an offset preventative such as a powder or spray is necessary when binders as disclosed herein are used.

The following examples will more clearly describe the application of the acetone-formaldehyde resin binders. I do not wish to be limited to the quantities used or to the specific compounds employed as set forth in these examples.

*Example 1.*—A resin was prepared from 50 parts of acetone, 50 parts of paraformaldehyde, 5 parts of disodium phosphate and 1.25 parts of potassium hydroxide. The potassium hydroxide and disodium phosphate were dissolved in the least possible amount of water and added to the acetone-paraformaldehyde mixture. Heat was applied to start the reaction but thereafter the reaction proceeded without further addition of heat. At the end of 45 minutes a separate layer had formed which contained the resin. The two layers were separated and the resinous product washed until free of alkali or any unreacted acetone, paraformaldehyde or phosphate.

The product was clear and insoluble in acetone or benzene. By using xylol as a solvent a syrupy solution was obtained. The product was non-thixotropic.

*Example 2.*—The resin prepared as described in Example 1 was dissolved in xylol to give a free flowing liquid. Chrome green pigment was added to the resin solution giving a light-green, free-flowing composition which appeared suitable as an ink.

The ink was printed on various types of paper and these placed in an oven which was heated to 100° C. The ink on the paper quickly (six to ten seconds) became hard and could not be rubbed off. The dried print had a high gloss.

*Example 3.*—Resin syrup as made in Example 1 was dissolved in isopropyl alcohol. Carbon black was added to the isopropyl solution and a very satisfactory quick-drying ink was produced. The proportion of ingredients was:

| | Parts |
|---|---|
| Acetone-resin syrup | 1.9 |
| Isopropyl alcohol | 3.1 |
| Carbon black | 1.0 |

This ink dried in about 5 seconds at 70° C. and could not be rubbed off. The ink had a high gloss and although the film produced was hard there was no evidence of the ink-paper bond breaking on bending or crushing the paper.

*Example 4.*—A dull ink was made by using the following proportion of ingredients:

| | Parts |
|---|---|
| Acetone resin (Example 1) | 6 |
| Isopropyl alcohol | 44 |
| Carbon black | 10 |

The acetone resin and isopropyl alcohol were mixed and then the carbon black ground into this mixture. The ink was long, and on heating printed sheets for 1.5 seconds in an oven at 100° C. the ink dried to a hard film. The dry ink was not sticky. This composition also exhibited non-feathering qualities. The ink was dull and non-smudging.

*Example 5.*—A resin was made from the following ingredients:

| | Parts |
|---|---|
| Formalin | 50 |
| Acetone | 150 |
| Potassium carbonate | 2.5 |

The potassium carbonate was dissolved in the smallest possible amount of water and added to the acetone-formalin mixture. The mixture was heated under reflux for 2.5 hours. Hydrochloric acid subsequently was added until the mixture was neutral. The water and excess acetone were eliminated from the mixture by evaporation in vacuo. Next the resin syrup was dissolved in acetone which left behind the inorganic salts.

*Example 6.*—Acetone resin from Example 5 was used in the following formula:

| | Parts |
|---|---|
| Resin | 47.5 |
| Acetone | 32.0 |
| Paraffin wax | 0.5 |
| Carbon black | 20.0 |

The liquid ingredients were mixed and then the pigment was ground into the vehicle. A medium length ink resulted that gave glossy films on drying for two seconds at 80° C.

*Example 7.*—A resin was made from the following constituents:

| | Parts |
|---|---|
| Acetone | 18 |
| Formalin | 135 |
| NaOH solution (50%) | 15 |

All parts are by volume and the mixture of them was heated at reflux temperature for four hours. A clear, water-white solution resulted which was concentrated by evaporation at subatmospheric pressures after having been neutralized by HCl. The residue contained some water but this mixture was a clear, water-white syrup.

*Example 8.*—An ink was made using resin from Example 7, as a binder. The proportion of the constituents was:

| | Parts |
|---|---|
| Resin | 27 |
| Water | 53 |
| Titanox | 20 |

The ink was medium in length and flowed well. Printed sheets gave glossy films when dried at 110° C. for 4.5 seconds.

The preceding disclosures illustrate the varied use of acetone-formaldehyde resins as binders in quick-drying printing inks. The resins applicable for use in my invention may readily be made by reacting the two constituents, acetone and formaldehyde, in the presence of an alkaline catalyst, that is, a catalyst selected from the alkaline salts, oxides or hydroxides of alkali metals or alkaline earth metals. By varying the amount of catalyst and the reaction time a water-soluble resin can be made which becomes water-insoluble when subjected to heat treatment. When the reaction time is lengthened a resin is obtained which is insoluble in water but soluble in many of the common organic solvents.

The proportion of binder in the ink composition may vary within wide limits. If the ratio of binder to pigment is progressively lowered the ink becomes duller and shorter. Even when this ratio reaches the proportions of 1 to 2, there is no smudging of the printed matter. At a ratio of binder to pigment of 2.5 to 1 the ink has good covering power and high gloss. The length of the ink is in direct proportion to the amount of binder used. Modifying agents such as pigment extenders, hardeners, e. g., hexa, waxes and other ingredients, may be added to produce special properties. Paraffin wax is used in certain inks to retard the evaporation of highly volatile constituents.

Drying oils are not employed with the acetone-resin binders because of the relatively slow drying characteristics of the drying oils.

Water-soluble resins of the acetone-formaldehyde type are very advantageous because of their low cost and the fact that no fume removal system is necessary during printing. The latter is unusual in quick-drying inks of the solvent-removal type, especially when the finished print is water-insoluble. The flow of inks containing these binders can be varied within wide limits. No thixotropic properties are exhibited by the water-soluble types of acetone-formaldehyde resins. Because of the economic advantage this type of resin has over other resins in inks, it may be economically used for newsprinting and handbills. The resulting printed matter will be less subject to "show through" because of the absence of any mineral oil in the ink composition. Types suitable for most any typographic process can be made from the acetone-formaldehyde resins.

What I claim is:

1. A quick-drying printing ink composition comprising a binding agent consisting of a water-insoluble resin made by interaction of formaldehyde with acetone in the presence of an alkaline catalyst, pigmenting material, and a liquid organic solvent, for the resin, that is readily volatile at temperatures between 50° C. and 100° C., said printing ink composition being substantially neutral and substantially free of hardening agents and yielding a film which hardens on momentary subjection to a mild heating operation at a temperature not exceeding 100° C.

2. A quick-drying printing ink composition comprising a binding agent consisting of a water-insoluble resin made by interaction of formaldehyde with acetone in the presence of an alkaline catalyst, pigmenting material, a liquid organic solvent, for the resin, that is readily volatile at temperatures between 50 and 150° C. and an evaporation retardant, said printing ink composition being substantially neutral and substantially free of hardening agents and yielding a film which hardens on momentary subjection to a mild heating operation at a temperature not exceeding 100° C.

3. A quick-drying printing ink composition, according to claim 1, in which the liquid organic solvent is acetone.

4. A quick-drying printing ink composition, according to claim 1, in which the liquid organic solvent is isopropyl alcohol.

5. A quick-drying printing ink composition, according to claim 1, in which the liquid organic solvent is xylene.

6. A quick-drying printing ink composition comprising a binding agent consisting of a water-insoluble resin made by interaction of formaldehyde with acetone in the presence of an alkaline catalyst, pigmenting material, and a liquid organic solvent, for the resin, that is readily volatile at temperatures between 50° C. and 100° C., the proportion of said binding agent being substantially greater than the proportion of said pigmenting material, said printing ink composition being substantially free of hardening agents and yielding a glossy film which hardens on momentary subjection to a mild heating operation at a temperature not exceeding 100° C.

7. A quick-drying printing ink composition comprising a binding agent consisting of a water-insoluble resin made by interaction of formaldehyde with acetone in the presence of an alkaline catalyst, pigmenting material, and a liquid organic solvent, for the resin, that is readily volatile at temperatures between 50° C. and 100° C., the proportion of said binding agent being substantially less than the proportion of said pigmenting material, said printing ink composition being substantially free of hardening agents and yielding a dull film which hardens on momentary subjection to a mild heating operation at a temperature not exceeding 100° C.

CARLETON ELLIS.